Patented Aug. 30, 1927.

1,640,817

UNITED STATES PATENT OFFICE.

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS.

ART OF MAKING RECLAIMED RUBBER.

No Drawing.    Application filed October 22, 1926. Serial No. 143,520.

The invention relates to an improvement in the art of making reclaimed rubber. In the making of reclaimed rubber the rubber to be reclaimed, usually with fabric material with it, is shredded into relatively small pieces and the mass then subjected to devulcanization in a digester in the presence of heat and pressure. After the devulcanizing has been completed the mass is removed from the digester when it will be found that the rubber at times has a more or less hard and harsh consistency, after which is subjected to various milling operations by which it is prepared for future use.

Difficulty has heretofore been encountered owing to the fact that after the rubber is removed from the digester subsequent to the devulcanizing process, the pieces thereof are at times so hard as not to easily lend themselves to milling operations, and the object of the invention is to provide whereby the rubber during the devulcanizing process may be so treated that the product from the digester after devulcanization will be relatively soft and cheesy instead of hard and harsh as heretofore, and eminently suited for future milling operations. I have found that this effect may be obtained if there be mixed with the mass of rubber in the digester to be devulcanized any one or more of the albuminates of the metals including such as albuminate of iron, albuminate of zinc, or equivalent albuminate of a metal. In this connection there is preferably employed an albuminate of a metal which comprises some non-hydroscopic metal or inorganic base combined with some of the simple proteids of the albuminoid group and especially an albuminate of iron in which the combination in forming the albuminate is with a proteid like keratin or collagen. I prefer that there be used from two to six per cent of the albuminate to the theoretical weight of the rubber to be devulcanized in the digester although more than this may be used if desired. The albuminate thus added not only renders the rubber after devulcanization has been completed soft and cheesy, by which it is especially fitted for future milling operations, but also improves the texture of the rubber when subsequently vulcanized, making it firm, with high resistance to wear and abrasion and without impairment of elastic properties.

Having thus fully described my invention, I claim and desire to secure by Letters Patent of the United States:—

1. The process of reclaiming rubber which comprises the addition to the mass to be reclaimed of albuminate of a metal prior to devulcanization and then devulcanizing.

2. The process of reclaiming rubber which comprises the addition to the mass of albuminate of iron prior to devulcanization and then devulcanizing.

3. In the process of making reclaimed rubber by devulcanization, the step of mixing albuminate of a metal with the mass to be treated.

4. In the process of making reclaimed rubber by devulcanization, the step of mixing albuminate of iron with the mass to be treated.

5. Reclaimed rubber containing albuminate of a metal mixed with the rubber prior to devulcanization.

6. Reclaimed rubber containing albuminate of iron mixed with the rubber prior to devulcanization.

CHARLES H. CAMPBELL.